US007133531B2

(12) United States Patent
Karpenstein

(10) Patent No.: US 7,133,531 B2
(45) Date of Patent: Nov. 7, 2006

(54) DEVICE USING ANALOG CONTROLS TO MIX COMPRESSED DIGITAL AUDIO DATA

(76) Inventor: Nissim Karpenstein, 419 Clinton St., Apt. 3R, Brooklyn, NY (US) 11231

(*) Notice: Subject to any disclaimer, the term of this patent is extended or adjusted under 35 U.S.C. 154(b) by 784 days.

(21) Appl. No.: 09/794,183

(22) Filed: Feb. 27, 2001

(65) Prior Publication Data

US 2002/0118848 A1 Aug. 29, 2002

(51) Int. Cl.
*H04B 1/00* (2006.01)

(52) U.S. Cl. ....................................... 381/119; 381/109

(58) Field of Classification Search ................. 381/119, 381/28, 2, 61, 109; 84/625, 660, 697; 369/4
See application file for complete search history.

(56) References Cited

U.S. PATENT DOCUMENTS 4,524,452 A * 6/1985 Marshak ...................... 381/28
4,993,073 A 2/1991 Sparkes ...................... 381/119
5,299,267 A 3/1994 Nakamura .................. 381/119
5,402,501 A 3/1995 Silfvajt et al. .............. 381/119
5,647,008 A 7/1997 Farhangi et al. ............ 381/119
5,675,557 A * 10/1997 Hubinger ........................ 369/4
5,734,731 A * 3/1998 Marx ......................... 381/119
5,835,375 A 11/1998 Kitamura ................. 364/400.1
5,852,800 A 12/1998 Modeste et al. ............ 704/211
5,940,521 A 8/1999 East et al. .................. 381/119
5,969,283 A 10/1999 Looney et al. ................ 84/609
6,434,242 B1 * 8/2002 Yamada et al. ............. 381/119

* cited by examiner

*Primary Examiner*—Brian T. Pendleton
(74) *Attorney, Agent, or Firm*—Steven Horowitz

(57) ABSTRACT

Device includes a disc jockey mixing console with analog controls, crossfader and scratchpad and is used to mix audio tracks from compressed digital audio data sound recordings. One device substitutes for mixing console, turntables and records. For compressed digital audio data recordings, analog controls allow far superior manual dexterity for adjustment of volume and speed when mixing audio tracks as compared to digital mouse. Includes two audio outputs—a headphone and a main speaker output—having to analog convertors, analog controls in the form of knobs and sliders, a touch screen LCD panel for selecting and queuing songs and a computer with a processor, ROM storage means, RAM storage means, software and a hard disc to store audio tracks files. Optional interface between device and personal computer to upload songs, audio input and CD ROM drive for converting audio to compressed digital audio data.

25 Claims, 4 Drawing Sheets

DEVICE USING ANALOG CONTROLS TO MIX COMPRESSED DIGITAL AUDIO DATA

The present invention relates to mixing of sound recordings using analog controls and more particularly to such mixing of sound recordings in compressed digital audio data format.

In this patent application, the terms "mixing" or to "mix" refer to the process by which an individual who is controlling the selection and audio presentation of sound recordings for an audience and who usually is, although not necessary is, a professional or amateur disc jockey, gradually changes what the audience hears on the main speaker output from one (or more) sound recording to another (or more) different sound recording. In the simplest case, it means that the disc jockey or "controller" gradually lowers the volume on one song and gradually raises the volume on another song. During "mixing" it is volume that is being altered. By "song" is meant a type of sound of recording.

The process of mixing is not a plain and simple task but rather one in which art and skill is brought to bear. For example, a lay person might simply allow one record or disc to finish and then simply turn on the volume for another sound recording. That would not really be "mixing" but rather sequential presentation of songs. With "mixing", the controller or disc jockey, rather than simply let a song finish and the begin a new song, puts the new song on even as the first song is ending so that there is a period of time, which can range from a few seconds to several minutes, in which both songs are being heard in a "mix" of volumes.

The art, skill and/or taste with which that process of selecting and mixing songs is performed by a professional disc jockey can earn that disc jockey a great deal of monetary compensation—for example a night's work in a club in Manhattan on a Saturday night can run as high as $20,000 for a disc jockey. The skill that is brought to bear in the process of mixing in fact greatly changes the way the songs are heard by the audience. For the millions of people who either frequent clubs or parties and for the majority of people who at one time or another attend life cycle events such as weddings, bar mitzvahs and the like, songs are played at these clubs or events using sound recording equipment and it makes all the difference in the world how the mixing is performed.

A mobile disc jockey is one who brings equipment such as a mixing console, two or more turntables and a stack of records to a party or other event in order to perform. Presently, a mobile disc jockey or an amateur disc jockey would need to bring all this equipment in order to perform at a party or event. That is cumbersome. It would be advantageous to be able to bring only a single device that can do the same thing.

Vinyl LP records have been in the process of being replaced by digitally stored data on discs, commonly called CD's or compact discs. There also exists today a popular standard scheme for compressing digital audio data on discs into a format that holds a great deal more information on a single disc. The technical name for this popularly used format is Moving Picture Experts Group Audio Layer 3 although it is more commonly referred to as "MPEG-3" format. MPEG-3 format sound recordings are now becoming increasingly popular as a replacement for sound recordings such as songs in the form of digital data stored on CD's. Many songs may be available only on MPEG-3 format now or in the future—or only conveniently available in such format—just as many songs are not available or conveniently available on vinyl LP record format anymore. The present application contemplates the use of any compressed digital audio data format, not just the presently popular standard format call MPEG-3.

Typically, compressed digital audio data format songs are downloaded from a web site on the World Wide Web or from a peer to peer file sharing system (e.g. Napster) on the Internet onto a personal computer. Software that is commercially available or available on the Internet allows the mixing of compressed digital audio data format songs. However, the mixing process occurs by interacting with such software by means of a computer mouse, other computer pointing device or a computer keyboard used to adjust the volume of the songs. Anyone who has used both a computer mouse (or other pointing device or keyboard) and a knob or slider knows that the manual dexterity afforded by a computer mouse does not even approach the level of manual dexterity that a disc jockey using analog controls such as the knobs and sliders typically found in a mixing console is used to. Nor does it approach the level of manual dexterity that the disc jockey expects and needs in order to perform at the level that earns him his living. Simply put it, does not sound as good to hear mixing of sound recordings performed with the aid of a computer mouse as compared to mixing of sound recordings performed with the aid of analog controls, such as knobs and sliders. Since the actual skill of mixing is accomplished with old fashioned manual dexterity, the analog controls are far superior to the digital controls in affording this dexterity. Turning a knob in the real world where the knob is directly related to a level of volume provides much more control over the continuum of volume levels than dragging and clicking a computer mouse on a line on a computer screen.

Accordingly, if the mobile or amateur disc jockey or other controller desires his repertoire to include sound recordings that are available in compressed digital audio data format, the disc jockey or controller would have to either bring extensive equipment for performing the mixing using analog controls—namely, a mixing console, several turntables and a stack of discs and/or records and to include in the repertoire songs recorded in compressed digital audio data format he would also have to have a compressed digital audio player hooked into the mixing console. Alternatively, the disc jockey or controller would bring a personal computer having songs downloaded on its hard drive and use the software he obtained for mixing but then he would have to be satisfied with the level of mixing dexterity afforded by a computer mouse or other computer pointing device or keyboard. Neither of these options is close to ideal and has the aforementioned disadvantages.

Recently, another attempted solution to the problem of using compressed digital audio data format sound recordings in a convenient context has been offered. Numark Industries, based in North Kingstown, R.I., sells a piece of hardware that interfaces with the personal computer and it includes speed control sliders but it has no volume control. Accordingly, it does not solve the problem of mixing with a high level of manual dexterity.

The present invention is designed to overcome these problems and provide a device for mixing of compressed digital audio data format sound recordings that eliminates the need for cumbersome transporting of equipment and that simultaneously allows the required manual dexterity.

SUMMARY OF THE PRESENT INVENTION

In summary, the present invention is a single device that includes a disc jockey mixing console with analog controls such as sliders, crossfader and scratchpad and is used to mix audio tracks from compressed digital audio data sound recordings. One device substitutes for disc jockey mixing console, turntables and a stack of records. The device includes two audio outputs—a headphone and a main speaker output—in the form of digital to analog convertors, analog controls in the form of knobs and sliders, a touch screen LCD panel (sometimes referred to herein as a "touch screen") for selecting and queuing songs and a computer with a processor, ROM storage means, RAM storage means, software and a hard disc to store audio track files. The software converts each audio track from compressed digital audio data format to digital format, applies special effects to each audio track based on speed parameters supplied by the sliders and based on special effects parameters supplied the touch screen LCD panel and tone parameters supplied by the equalizing knobs and mixing the audio tracks that are in digital format using volume parameters provided by the analog controls to generate a final mix. The device also may contain an optional interface between the device and personal computer to upload songs from the personal computer and to download songs on to the personal computer for marketing the final mix performance over the Internet, and it may contain optional means, an audio input, to convert analog vinyl LP discs to compressed digital audio data format and other optional means, a CD ROM drive, to convert digitally recorded songs on CDs into compressed digital audio data format while they are being played.

OBJECTS AND ADVANTAGES

The following are important objects and advantages of the present invention:

(1) to provide a device for mixing sound recordings in compressed digital audio data format;

(2) to provide a device for mixing compressed digital audio data that allows the level of manual dexterity that is commonly available to disc jockeys doing mixing using analog controls and which is of a level of manual dexterity that far exceeds the level afforded by a computer mouse or other computer pointing device;

(3) to provide a single compact device for mixing compressed digital audio data that carries out the function of a disc jockey mixing console, a stack of records and a plurality of turntables;

(4) to provide a device for mixing compressed digital audio data comprising a headphone and a main speaker output in the form of digital to analog convertors, analog controls in the form of knobs and sliders, a touch screen LCD panel for selecting and queuing songs and a computer with a processor, ROM storage means, RAM storage means, software and a hard disc to store audio files;

(5) to provide a device for mixing compressed digital audio data with the optional capability of also mixing audio of traditional formats such as digital data records CD's and vinyl records by converting the vinyl records or CD records to compressed digital audio data format while or before they are being played and mixed; and (6) to provide a device for mixing compressed digital audio data that has an interface between the device and a personal computer in order to upload songs from the personal computer to the device and in order to download sound recordings containing the mixing performed with the device to the personal computer for further sale and advertisement on the Internet or other global communication network.

DETAILED DESCRIPTION OF THE PREFERRED EMBODIMENT

In this patent application, the term song is used interchangeably with the term sound recording since a song is a type of sound recording.

Figure 1:
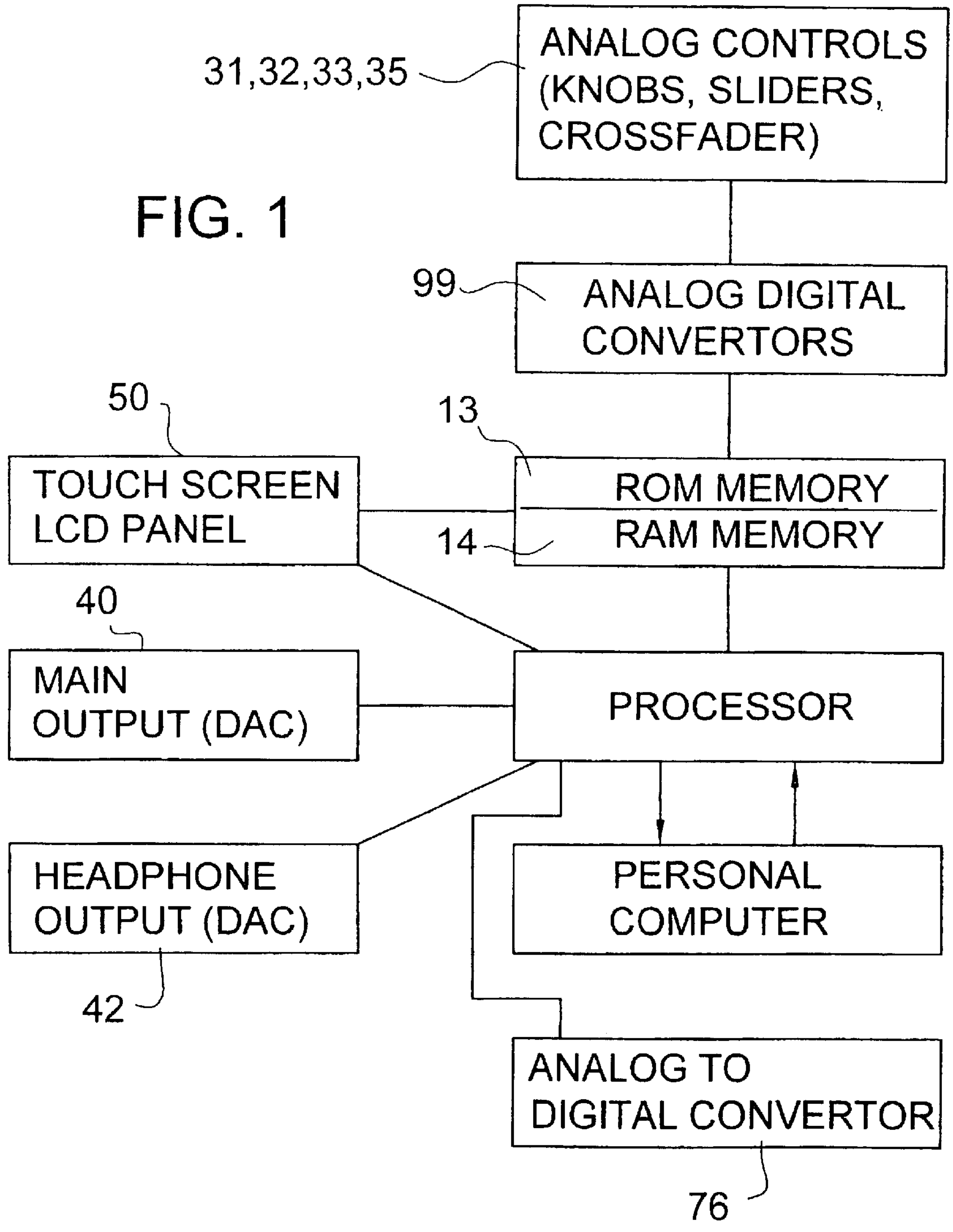
FIG. 1 is a block diagram of the elements of the device of the present invention.
Figure 2A:
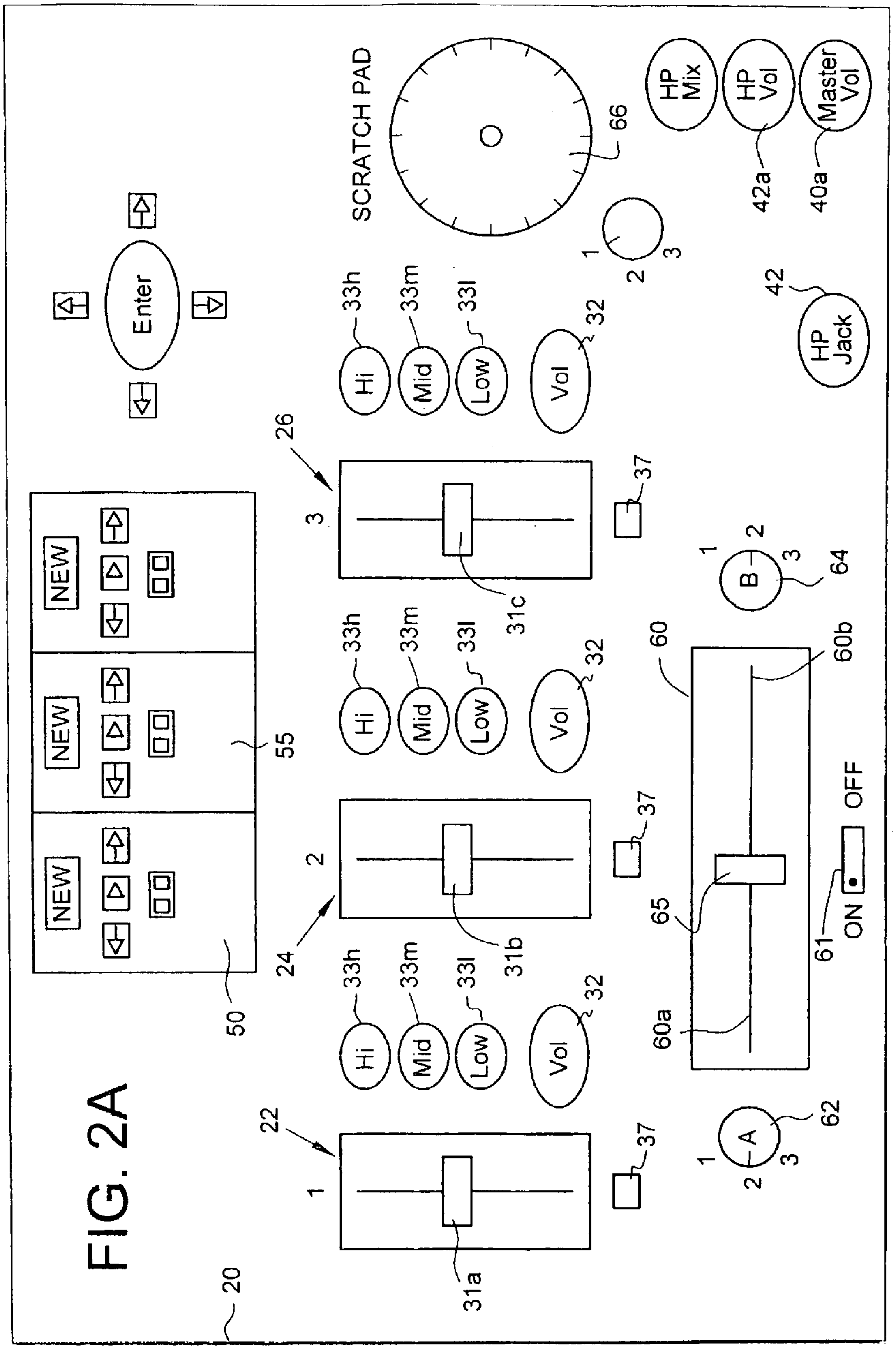
FIGS. 2A, 2B are front views of the disc jockey mixing console of the device of the present invention showing the analog controls in various positions.
Figure 2B:
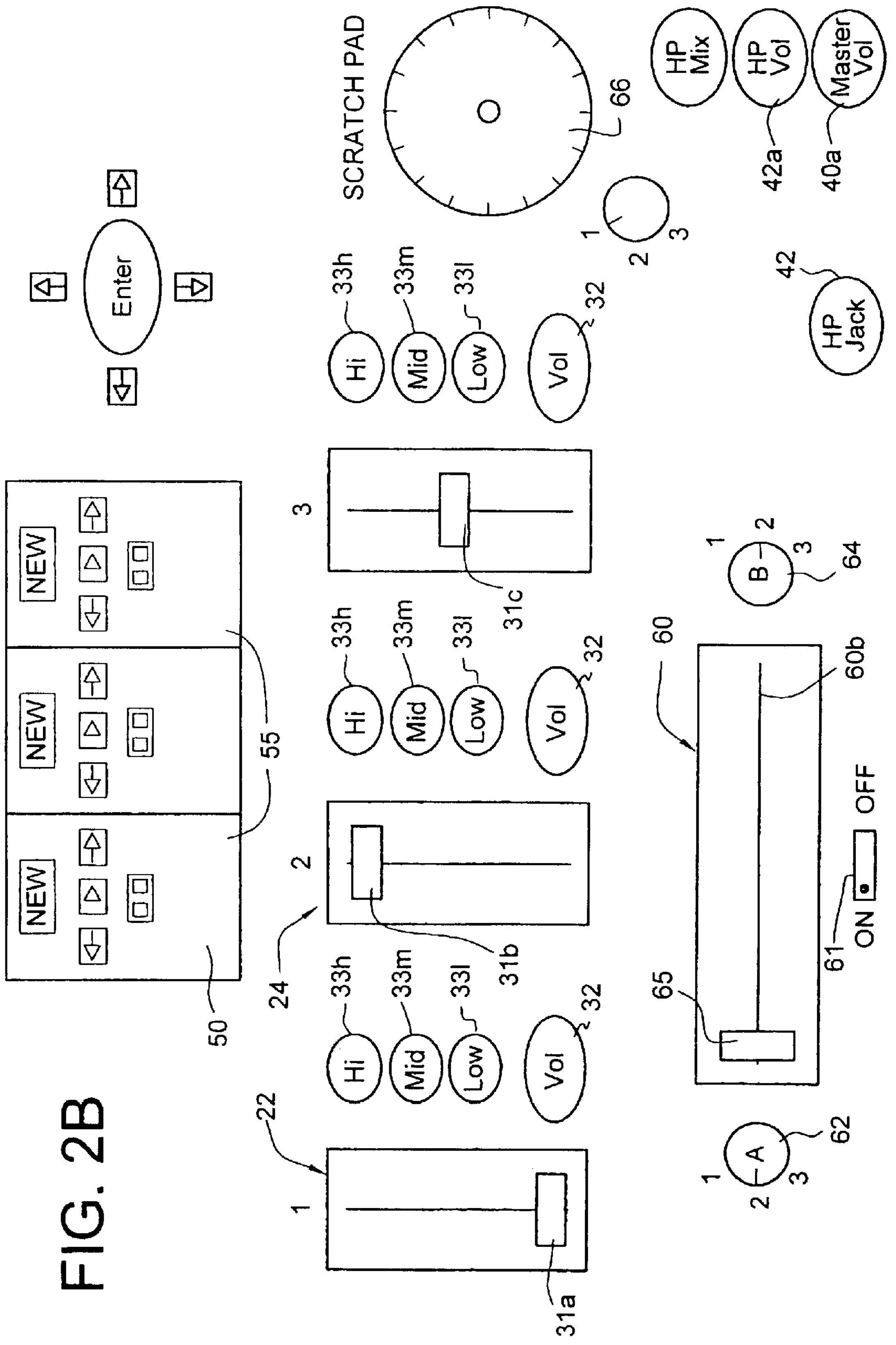

In general, as seen in FIG. 1, the device 10 of the present invention is a single unit that encompasses the functions of a disc jockey mixing console, turntables and a stack of records.

Device 10 is used for mixing audio tracks of sound recordings that are in compressed digital audio data format. This eliminates the need for a disc jockey mixing console, a plurality of turntables or a plurality of vinyl LP records. Device 10 comprises a disc jockey mixing console 20 with three or more audio tracks 22, 24, 26. Mixing console 20 has analog controls 30 including, for each audio track 22, 24, 26, a slider 31*a*, 31*b*, 31*c*, (assuming there are three audio tracks) for adjusting speed and a main output volume knob 32 for adjusting volume heard on the main speaker output 40, equalizing knobs 33*h*, 33*m*, 33*l* and including a crossfader slider forming part of crossfader 60 for single-handed fading from one audio track to another on a main speaker output 40 and a scratchpad 66 for special effects. Typically, for each audio track there are also three equalizing knobs 33—one for high or treble, one for mid-level and one for low or bass.

In the main embodiment but not the alternative embodiment, each equalizing knob 33, each main output volume knobs 42, each slider 31 and the crossfader slider 65, which are all analog controls 30, is connected to an analog to digital converter 99 to translate the analog position of these analog controls into a numerical value for the computer 11.

Scratchpad 66 is used to make scratching sound effects by physically rotating scratchpad 66. Use of scratchpad 66 has a switch 66*a* that allows its effect to be limited to a one-time effect on a particular audio track 22, 24, 26.

The term "speed" used herein refers at a minimum to the count or tempo of the sound recording, sometimes measured in beats per minute. In analog audio increasing the speed automatically increases the pitch of the sound recording. In digital format, the speed can be increased without altering the pitch. Hence, in device 10 of the present invention the user has the option of increasing the tempo and the pitch or increasing the tempo without increasing the pitch. As used herein, therefore, the term "speed" refers to the tempo with or without the pitch.

For each audio track 22, 24, 26 the mixing console also has a preview button 37 for use of headphones 42. It should be noted that the number of audio tracks included in the device 10 can range from as few as two to as many as approximately six.

Device 10 also includes two audio outputs 40, 42 including a headphone 42 or headphone output 42 and a main speaker output 40. These two audio outputs 40, 42 each have a digital to analog convertor. Headphone output 42 (made up of a digital to analog convertor, a headphone volume knob 42*a* and a headphone jack) also includes analog controls, e.g. headphone volume knob 42*a*, for adjusting a volume of a final mix analog audio heard on the headphone 42. Console 20 also includes main output master volume knob 40*a* for controlling the volume of the final mix analog audio. Headphone volume knob 42*a* and main output master volume knob 40*a* are also analog controls 30 but are not connected to the computer 11 and do not interact with the software.

Device 10 also includes a touch screen LCD panel 50 (also called simply a "touch screen"). Touch screen LCD panel 50 may be divided into sections 55 with each section 55 corresponding to a single audio track 22, 24, 26. Each section 55 typically has a button for selecting a "new" song and several buttons for queuing sound recordings played on that audio track, for example audio track one 22 and those button would at least include a button for play mode, a button for rewind mode, a button for forward mode and a button for pause mode. Each section 55 would also have a button for opening a menu of special effects that are selected to be applied to that audio track (for example audio track one 22) in digital format. Touch screen LCD panel 50 also includes an area in each section 55 for a particular audio track, say audio track one 22 for example, in which is shown a graphical display of a wave form of a song in a play mode on that audio track 22, 24, 26.

Device 10 includes a computer 11, that has a processor 12, ROM storage means 13 for storing the software, RAM storage means 14, a hard disc 15 to store audio sound track files, and software 16. Processor 12, which means one processor or a main processor and co-processors specialized in digital signal processing and/or in compressed audio data encoding and decoding, uses software 16 that decodes each audio track from compressed digital audio data format to digital format, applies special effects to each audio track based on speed parameters supplied by the sliders 31 and based on special effects parameters supplied the touch screen LCD panel 50 and based on tone parameters supplied by the equalizing knobs 33. The software also mixes the audio tracks 22, 24, 26 that are in digital format using volume parameters provided by the analog controls to generate a final mix digital output. As part of the process of creating a final mix digital output, the software 16 also interprets the placement of the crossfader slider to determine which audio track volume to be heard on the main speaker output 40, as detailed further below.

Software 16 also mixes audio tracks 22, 24, 26 to be heard in the headphone output 42 by creating a headphone mix digital output from the preview buttons 37.

Once there is a final mix digital output, the software 16 sends the final mix digital output to the digital to analog convertor of the main speaker output to be converted to final mix analog audio. For example, volume parameters represented digitally might be volume at 70% of the maximum range in audio track one and volume at 25% of the maximum range in audio track two.

Once there is a headphone mix digital output, software 16 sends it to the digital to analog convertor 42*a* of the headphone output 42 to be converted to headphone mix analog audio.

The single device 10 allows a disc jockey to manually mix and manually adjust the speed of compressed digital audio data sound recordings with a level of manual dexterity typically used in the mixing of vinyl records, and this level of manual dexterity far exceeds the level of manual dexterity provided by a computer mouse or other computer pointing device.

Figure 3:
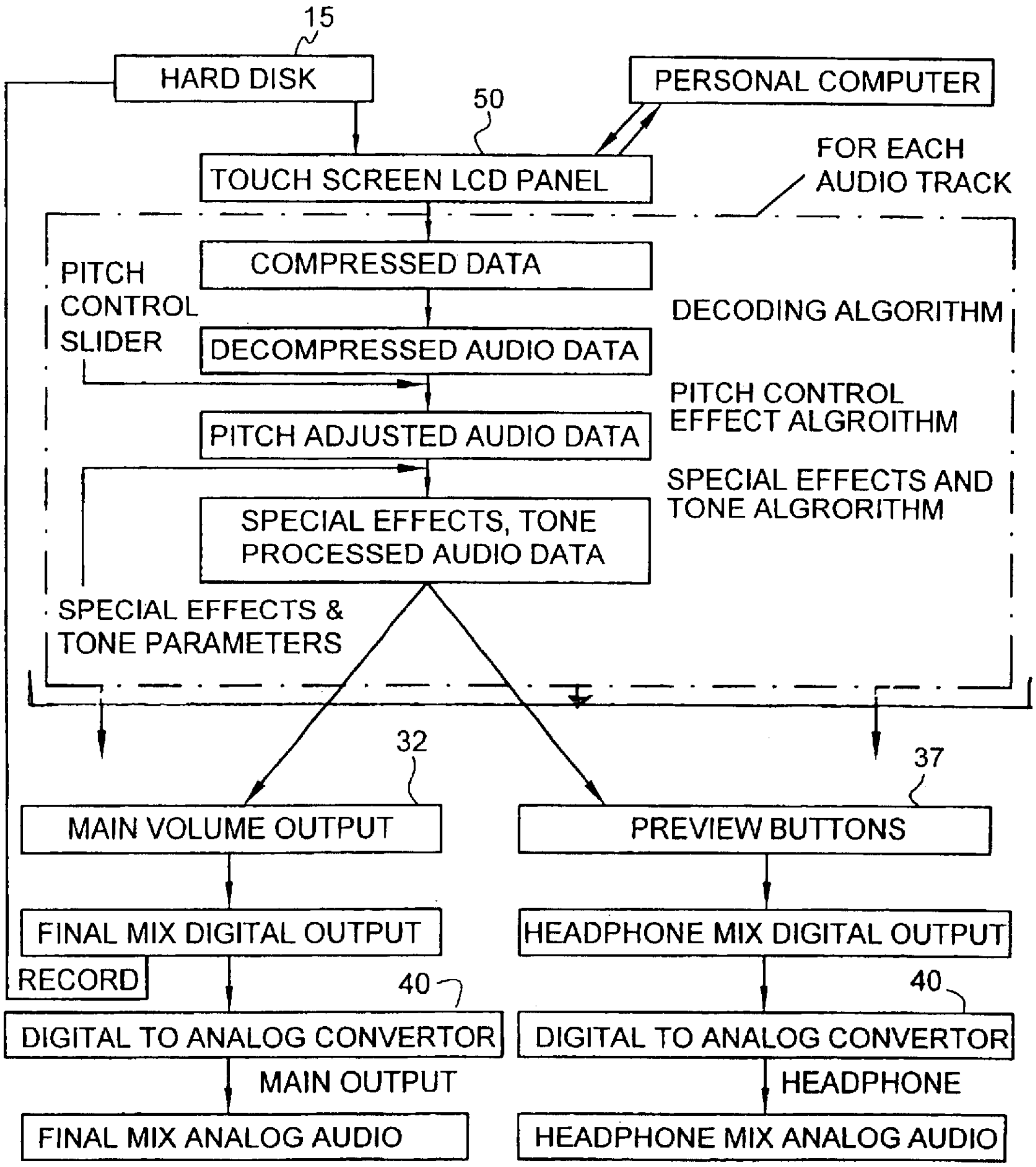
FIG. 3 is a block diagram of the steps performed by the device of the present invention.

Device 10 also allows the user or controller to re-encode the final mix digital output into compressed digital audio data format which can then be stored on hard disc 15 of computer 11 within device 10 to be played later as a single sound recording on a particular audio track 22 as an element in a further mix. In the main embodiment, although not in the alternative embodiment described below, by pushing a "record" button on touch screen 50 while the final mix digital output is being played on the main speaker output 40, device 10 automatically encodes the final mix digital output into compressed digital audio data format and stores it on the hard disk for future selection by touch screen 50, as seen in FIG. 3. This editing feature permits the user or controller to perform editing of a song with the device 10 such as by splicing in one part of a song to a second location.

Device 10 also includes an optional interface 88 between 10 and an external personal computer 111 for uploading sound recordings from the personal computer 111 to the device 10 and for downloading an audio mixing performance created using the device 10 on to the personal computer 111 from the device 10 for the purpose of advertising and/or selling the audio mixing performance through a global telecommunications network.

Device 10 includes an optional audio input 77 comprising an analog to digital converter 76 for converting sound recordings in analog format to compressed digital audio data format and an optional CD ROM drive 79 for converting sound recordings in digital format to compressed digital audio data format thereby allowing the device 10 to be used with a high degree of manual dexterity for mixing sound recordings in either compressed digital audio data format or CD format for noncompressed digital data.

The crossfader 60 has an on/off switch 61, a left crossfader switch 62 having settings corresponding to each audio track on the disc jockey mixing console, a right crossfader switch 64 having settings corresponding to each audio track on the disc jockey mixing console (e.g. a three-way switch if there are three audio tracks) and a crossfader slider 65 between the left crossfader switch 62 and the right crossfader switch 64. Manual placement of the crossfader slider 65 on a left end 60*a* triggers the audio track that corresponds to the setting on the left crossfader switch 62 to be audible on the main speaker output 40. Likewise, manual placement of the crossfader slider 65 on a right end 60*b* triggers the audio track that corresponds to the setting on the right crossfader switch 64 to be audible on the main speaker output 40. Placement of the crossfader slider 65 in a middle area 60*c* triggers both the audio track that corresponds to the setting on the left crossfader switch 62 and the audio track that corresponds to the setting on the right crossfader switch 64 to be simultaneously audible on the main speaker output 40.

In an alternative embodiment the device 10 is the same except that the actual mixing is done in analog format rather than in digital format. Instead of a final mix digital output being generated by the software, after the software decodes each audio track from compressed digital audio data format to digital format and applies special effects to each audio track in the same way as the preferred embodiment, the software then sends each audio track 22, 24, 26 in digital format to the digital to analog convertors associated with that audio track for conversion into analog format. Then the output of the digital to analog convertors for each audio track is connected by an analog audio mixing circuit to well known analog mixing controls in order to carry out mixing of analog format sound recordings. The alternative embodiment necessitates one or two additional digital to analog converters but requires thirteen fewer analog to digital convertors. It should be noted in this regard that the crossfader slider 65, the main output volume knob 32 for each audio track and the three equalizing knobs 33 for each audio track 22, 24, 26 add up to thirteen digital to analog converters that are unnecessary with the alternative embodiment whereas in the main embodiment there is an analog to digital convertor for each of these thirteen knobs, in the alternative embodiment these thirteen knobs are connected to the analog mixing circuitry rather than to the converters that provide the parameters for the digital mixing program. The main advantage of the alternative embodiment is that it is not necessary to be concerned about synchronizing the timing in which the sound recordings are heard in the main output and the headphone since there is no case of software sending the same signal to different outputs; rather the mixing is done in analog.

It should be noted that the user uses the analog controls in exactly the same way whether the mixing is done in digital format as in the main embodiment or in analog format as in the alternative embodiment.

The following is an example of how a user of the device 10 of the present invention might mix two sound recordings. In this example, the user is beginning with the first song and does not have any song playing already. The user selects a song (which is a kind of sound recording) on the touch screen LCD panel corresponding to a particular audio track, for example the first audio track 22. The user presses the play button on the touch screen 50 for that song. Using the main output volume knob 32 the user brings the volume up on the main output 40.

The user now wants to bring in a second song but first wants to listen to it on the headphone 40 without the audience hearing it. The user turns on the headphone output 42 with the button on the mixing console 20 corresponding to that same audio track 22. Using the buttons on the section 55 of the touch screen 50 corresponding to the second audio track 24, the user then selects and queues a second song to reach the point in the song that is desired and hits the play button on the touch screen for the second audio track 24 for the second song. The user adjusts the speed of the second song using the analog slider 31*b* for audio track two 24. The user brings up the volume of the second song on the main output 40 by turning the main output volume knob 32 for audio track two 24. The second song still remains audible on the headphone output 42. The user then brings down the volume of the first song on the main output 40 by turning the main output volume knob 32 for audio track one 22. Using this procedure, the user can repeat the process whenever the user desires to bring a new song into the performance heard by the audience. The only difference is that the above process describes a situation that begins with no songs being played so that to mix a third song with the second song the user merely picks up the point in the process at which it was being described how the user mixes the second song with the first song, i.e. the beginning of this paragraph.

FIG. 3 is a flowchart showing how sound recordings in compressed format are mixed by the device 10 of the present invention. After a song is selected on a particular audio track 22 using touch screen 50, compressed digital audio data from the song is decompressed and converted into digital audio data by a decoding algorithm in software 16. The speed of the digital audio data is adjusted based on the parameters of the speed control slider 31*a* by software 16. Equalizing knobs 33 provide tone parameters to the speed adjusted audio data and the software 16 adjusts the tone accordingly. It should be noted that the adjustments of speed, tone and other special effects can occur in any order and that the term "special effects" includes speed and tone. Other well known special effects, such as "reverb", "chorus", "delay", "flange" and "echo" are applied using the touch screen 50 and software 16 adjusts the digital audio data accordingly. This procedure is followed for one or for more than one audio tracks. Then the resulting adjusted digital data from each of the audio tracks 22, 24, 26 is outputted both to main speaker output 40 and headphone output 42. The adjusted digital data is then mixed on the audio tracks heard on the main speaker output 40 using volume parameters provided by the analog controls to generate a final mix digital output. Similarly, the adjusted digital data is mixed on the audio tracks heard on the headphone output 42 using the preview button 37 to generate a headphone mix digital output. The final mix digital output is sent to the digital to analog converter of the main speaker output 40 to be converted into final mix analog audio. The headphone mix digital output is sent to the analog to digital convertor of the headphone output 42 to be converted to headphone mix analog audio.

It should be noted that the use in this patent application of the term "button" refers to any digital control in any shape or form and is not limited to a control necessarily in the shape, appearance or operation of what would commonly be characterized as a button that is pressed. For example, the term "button" when used on the mixing console with respect to the preview button for headphone usage may be a standard button control that moves perpendicular to the face of the mixing console when it is pushed. On the other hand, "buttons" on the touch screen do not move when pushed—rather they respond to pressure or body heat of the fingers or some other mechanism that allows it to respond to commands communicated simply by pressing the finger against the screen at a particular location.

It is to be understood that while the device of the present invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A device for mixing audio tracks of sound recordings that are in compressed digital audio data format and which eliminates the need for a disc jockey mixing console, a plurality of turntables or a plurality of vinyl LP records, said device comprising:

a disc jockey mixing console with two or more audio tracks and having analog controls including, for each audio track, a slider for adjusting speed and a main output volume knob for adjusting volume heard on a main speaker output, and including a preview switch for audio tracks, two audio outputs including a headphone output and the main speaker output, said two audio outputs each including a digital to analog convertor, the headphone output also including analog controls for adjusting a volume of a final mix analog audio heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audio track based on speed parameters supplied by the sliders mixing the audio tracks heard on the headphone output that are in digital format using volume parameters provided by the analog controls to generate a final mix digital output and sending the final mix digital output to the digital to analog convertor of the main speaker output to be converted to final mix analog audio, and mixing the audio tracks heard on the headphone output that are in digital format using a preview switch to generate a headphone mix digital output and sending the headphone mix digital output to the digital to analog convertor of the headphone output to be converted to headphone mix analog audio, each main output volume knob and each slider being connected to an analog to digital convertor to translate the analog position into a numerical value for the computer, said single device allowing a disc jockey to manually mix and manually adjust the speed of compressed digital audio data sound recordings with a level of manual dexterity typically used in the mixing of vinyl LP records, said level of manual dexterity far exceeding the level of manual dexterity provided by a computer pointing device, including an interface between the device and an external personal computer for uploading sound recordings from the personal computer to the device.

2. The device of claim 1, wherein the analog controls include a crossfader for single-handed fading from one audio track to another on the main speaker output.

3. The device of claim 2, wherein the analog controls include equalizing knobs for each audio track.

4. The device of claim 3, wherein the analog controls also include a scratchpad for special effects and wherein the device has a button in each audio track for opening a menu of special effects and selecting one or more special effects to be applied to that audio track in digital format.

5. The device of claim 4, wherein the LCD screen includes a graphical display of a wave form of an audio sound track in a play mode.

6. The device of claim 4, wherein the software applies special effects to each audio track based also on special effects parameters supplied by the LCD screen and on tone parameters supplied by the equalizing knobs.

7. The device of claim 2, wherein the crossfader has an on/off switch, a left crossfader switch having settings corresponding to each audio track on the disc jockey mixing console, a right crossfader switch having settings corresponding to each audio track on the disc jockey mixing console and a crossfader slider between the left crossfader switch and the right crossfader switch, and wherein manual placement of the crossfader slider on a left end triggers the audio track that corresponds to the setting on the left crossfader switch to be audible on the main speaker output, wherein manual placement of the crossfader slider on a right end triggers the audio track that corresponds to the setting on the right crossfader switch to be audible on the main speaker output and wherein placement of the crossfader slider in a middle area triggers both the audio track that corresponds to the setting on the left crossfader switch and the audio track that corresponds to the setting on the right crossfader switch to be simultaneously audible on the main speaker output.

8. The device of claim 4, wherein the buttons on the device for queuing sound recordings include at least a button for play mode, a button for rewind mode, a button for forward mode and a button for pause mode.

9. A device for mixing audio tracks of sound recordings that are in compressed digital audio data format and which eliminates the need for a disc jockey mixing console, a plurality of turntables or a plurality of vinyl LP records, said device comprising:

a disc jockey mixing console with two or more audio tracks and having analog controls including, for each audio track, a slider for adjusting speed and a main output volume knob for adjusting volume heard on a main speaker output, and including a preview switch for audio tracks, two audio outputs including a headphone output and the main speaker output, the headphone output also including analog controls for adjusting a volume of final mix analog audio heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to permanently store audio sound track files, and software for decoding each audio track from compressed digital audio data format to digital format, applying special effects to each audio track based on speed parameters supplied by the sliders, mixing the audio tracks hear on the main speaker output that are in digital format using volume parameters provided by the analog controls to generate a final mix digital output and sending the final mix digital output to the digital to analog convertor of the main speaker output to be converted to final mix analog audio, and mixing the audio tracks heard on the headphone output that are in digital format using a preview switch to generate a headphone mix digital output and sending the headphone mix digital output to the digital to analog convertor of the headphone output to be converted to headphone mix analog audio, each main output volume knob and each slider being connected to an analog to digital convertor to translate the analog position into a numerical value for the computer, said single device allowing a disc jockey to manually mix and manually adjust the speed of compressed digital audio data sound recordings with a level of manual dexterity typically used in the mixing of vinyl LP records, said level of manual dexterity far exceeding the level of manual dexterity provided by a computer pointing device, including an editing feature wherein a "record" button on the device allows the disc jockey to record the final mix digital output while the device plays the final mix digital output on the main speaker output which automatically encodes the final mix digital output in compressed digital audio data format and stores the final mix digital output on the hard disc as an audio sound track file that can be selected and played as a single sound recording on a particular audio track later as an element in a further mix.

10. A device for mixing audio tracks of sound recordings that are in compressed digital audio data format and which eliminates the need for a disc jockey mixing console, a plurality of turntables or a plurality of vinyl LP records, said device comprising:

a disc jockey mixing console with two or more audio tracks and having analog controls including, for each audio track, a slider for adjusting speed, a main output volume knob for adjusting volume heard on a main speaker output, and including a preview switch for audio tracks, each audio track having a digital to analog converter, two audio outputs including a headphone output and the main speaker output, the headphone output also including analog controls for adjusting a volume of audio mix heard on the headphone, said headphone output activated by the preview switch an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audio track based on speed parameters supplied by the sliders and sending each audio track in digital format to a digital to analog convertor associated with each audio track for conversion to analog format, an analog audio mixing circuit connecting the analog controls to an output of the digital to analog convertors for each audio track for performing analog mixing, said single device allowing a disc jockey to manually mix compressed digital audio data sound recordings with a level of manual dexterity typically used in the mixing of vinyl LP records, said level of manual dexterity far exceeding the level of manual dexterity provided by a computer pointing device, including an interface between the device and an external personal computer for uploading sound recordings from the personal computer to the device.

11. The device of claim 10, wherein the analog controls include a crossfader for single-handed fading from one audio track to another on the main speaker output.

12. The device of claim 11, wherein the analog controls include equalizing knobs for each audio track.

13. The device of claim 12, wherein the analog controls also include a scratchpad for special effects and wherein the device includes a button in each audio track for opening a menu of special effects and selecting one or more special effects to be applied to that audio track in digital format.

14. The device of claim 13, wherein the LCD screen includes a graphical display of a wave form of an audio sound track in a play mode.

15. The device of claim 13, wherein the software applies special effects to each audio track based also on special effects parameters supplied by the LCD screen and on tone parameters supplied by the equalizing knobs.

16. The device of claim 11, wherein the crossfader has an on/off switch, a left crossfader switch having settings corresponding to each audio track on the disc jockey mixing console, a right crossfader switch having settings corresponding to each audio track on the disc jockey mixing console and a crossfader slider between the left crossfader switch and the right crossfader switch, and wherein manual placement of the crossfader slider on a left end triggers the audio track that corresponds to the setting on the right crossfader switch to be audible on the main speaker output and wherein placement of the crossfader slider in a middle area triggers both the audio track that corresponds to the setting on the left crossfader switch and the audio track that corresponds to the setting on the right crossfader switch to be simultaneously audible on the main speaker output.

17. A device for mixing audio tracks of sound recordings that are in compressed digital audio data format and which eliminates the need for a disc jockey mixing console, a plurality of turntables or a plurality of vinyl LP records, said device comprising:

a disc jockey mixing console with two or more audio tracks and having analog controls including, for each audio track, a slider for adjusting speed, and a main output volume knob for adjusting volume heard on a main speaker output, and including a preview switch for audio tracks, two audio outputs including a headphone output and the main speaker output said two audio outputs each including a digital to analog convertor, the headphone output also including analog controls for adjusting a volume of a final mix analog audio heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audiotrack based on speed parameters supplied by the sliders, mixing the audio tracks heard on the main speaker output that are in digital format using volume parameters provided by the analog controls to generate a final mix digital output and sending the final mix digital output to the digital to analog convertor of the main speaker output to be converted to final mix analog audio, and mixing the audio tracks heard on the headphone output that are in digital format using a preview switch to generate a headphone mix and sending the headphone mix digital output to the digital to analog convertor of the headphone output to be converted to headphone mix analog audio, each main output volume knob and each slider being connected to an analog to digital convertor to translate the analog position into a numerical value for the computer, said single device allowing a disc jockey to manually mix and manually adjust the speed of compressed digital audio data sound recordings with a level of manual dexterity typically used in the mixing of vinyl LP records, said level of manual dexterity far exceeding th level of manual dexterity provided by a computer pointing device, wherein the analog controls include a crossfader for single-handed fading from one audio track to another on the main speaker output, and wherein the crossfader has an on/off switch, a left crossfader switch having settings corresponding to each audio track on the disc jockey mixing console, a right crossfader switch having settings corresponding to each audio track on the disc jockey mixing console and a crossfader slider between the left crossfader switch and the right crossfader switch, and wherein manual placement of the crossfader slider on a left end triggers the audio track that corresponds to the setting on the left crossfader switch to be audible on the main speaker output, wherein amnual placement of the crossfader slider on a right end triggers the audio track that corresponds to the setting on the right crossfader switch to be audible on the main speaker output and wherein placement of the crossfader slider in a middle area triggers both the audio track that corresponds to the setting on the left crossfader switch and the audio track that corresponds to the setting on the right crossfader switch to be simultaneously audible on the main speaker output.

18. A device for mixing audio tracks of sound recordings that are in compressed digital data format and which eliminates the need for a disc jockey mixing console, a plurality of turntables or a plurality of vinyl LP records, said device comprising:.

a disc jockey mixing console with two or more audio tracks and having analog controls including, for each audio track, a slider for adjusting speed and a main output volume knob for adjusting volume heard on a main speaker output, and including a preview switch for audio tracks, two audio outputs including a headphone output and the main speaker output, said two audio outputs including a digital to analog convertor, the headphone output also including analog controls for adjusting a volume of a final mix analog audio heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audio track based on speed parameters supplied by the sliders, mixing the audio tracks heard on the main speaker output that are in digital format using volume parameters provided by the analog controls to generate a final mix digital output and sending the final mix digital output to the digital to analog convertor of the main speaker output to be converted to final mix analog audio, and mixing the audio tracks heard on the headphone output that are in digital format using a preview switch to generate a headphone mix digital output and sending the headphone mix digital output to the digital to analog convertor of the headphone output to be converted to headphone mix analog audio, each main output volume knob and each slider being connected to an analog to digital convertor to translate the analog position into a numerical value for the computer said single device allowing a disc jockey to manually mix and manually adjust the speed of compressed digital audio data sound recordings with a level of manual dexterity typically used in the mixing of vinyl LP records, said level of manual dexterity far exceeding the level of manual dexterity provided by a computer pointing device, wherein the analog controls include a crossfader for single-handed fading from one audio track to another on the main speaker output, wherein the analog controls include equalizing knobs for each audio track, and including an editiing feature wherein a "record" button on the device allows the disc jockey to record the final mix digital output while the device plays the final mix digital output on the main speaker output which automatically encodes the final mix digital output in compressed digital audio data format and stores the final mix digital output on the hard disc as an audio sound track file that can be selected and played as a single sound recording on a particular audio track later as an element in a further mix.

19. A device for mixing audio tracks of sound recordings that are in compressed digital audio data format and which eliminates the need for a disc jockey mixing console, a plurality of turntables or a plurality of vinyl LP records, said device comprising:.

a disc jockey mixing console with two or more audio tracks and having analog controls including, for each audio track, a slider for adjusting speed and a main output volume knob for adjusting volume heard on a main speaker output, and including a preview switch for audio tracks, two audio outputs including a headphone output and the main speaker output, said two audio outputs each including a digital to analog convertor, the headphone output also including analog controls for adjusting a volume of final mix analog audio heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audio track based on speed parameters supplied by the sliders, mixing the audio tracks heard on the main speaker output that are in digital format using volume parameters provided by the analog controls to generate a final mix digital output and sending the final mix digital output to the digital to analog convertor of the main speaker output to be converted to final mix analog audio, and mixing the audio tracks heard on the headphone output that are in digital format using a preview switch to generate a headphone mix digital output and sending the headphone mix digital output to the digital to analog convertor of the headphone output to be converted to headphone mix analog audio, each main output volume knob and each slider being connected to an analog to digital convertor to translate the analog position into a numerical value for the computer, said single device allowing a disc jockey to manually mix and manually adjust the speed of compressed digital audio data sound recordings with a level of manual dexterity typically used in the mixing of vinyl LP records, said level of manual dexterity far exceeding the level of manual dexterity provided by a computer pointing device, wherein the analog controls include a crossfader for single-handed fading from one audio track to another on the main speaker output, wherein the analog controls include equalizing knobs for each audio track and wherein the analog controls also include a scratchpad for special effects and wherein the device includes a button in each audio track for opening a menu of special effects and selecting one or more special effects to be applied to that audio track in digital format.

20. The device of claim 19, wherein the LCD screen includes a graphical display of a wave form of an audio sound track in a play mode.

21. The device of claim 19, wherein the software applies special effects to each audio track based also on special effects parameters supplied by the LCD screen and on tone parameters supplied by the equalizing knobs.

22. A device for mixing audio tracks of sound recordings that are in compressed digital audio data format and which eliminates the need for a disc jockey mixing console, a plurality of turntable or a plurality of vinyl LP records, said device comprising:

a disc jockey mixing console with two or more audio tracks and having analog controls including, for each audio track, a slider for adjusting speed, a main output volume knob for adjusting volume heard on a main speaker output, and including a preview switch for audio tracks, each audio track having a digital to analog converter, two audio outputs including a headphone output and the main speaker output, the headphone output also including analog controls for adjusting a volume of audio mix heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audio track based on speed parameters supplied by the sliders and sending each audio track in digital format to a digital to analog convertor associated with each audio track for conversion to analog format, an analog audio mixing circuit connecting the analog controls to an output of the digital to analog convertors for each audio track for performing analog mixing, said single device allowing a disc jockey to manually mix compressed digital audio data sound recordings with a level of manual dexterity typically used in the mixing of vinyl LP records, said level of manual dexterity far exceeding the level of manual dexterity provided by a computer pointing device, wherein the analog controls include a crossfaded for single-handed faded from one audio track to another on the main speaker output, wherein the analog controls include equalizing knobs for each audio track, and wherein the analog controls also include a scratch pad for special effects and wherein the device includes a button in each audio track for opening a menu of special effects and selecting one or more special effects to be applied to that audio track in digital format.

23. The device of claim 22, wherein the LCD screen includes a graphical display of a wave form of an audio sound track in a play mode.

24. The The device of claim 22, wherein the software applies special effects to each audio track based also on special effects parameter supplied by the LCD screen and on tone parameters supplied by the equalizing knobs.

25. A device for mixing audio tracks of sound recordings that are in compressed digital audio data format and which eliminates the need for a disc jockey mixing console, a plurality of turntables or a plurality of vinyl LP records, said device comprising:

a disc jockey mixing console with two or more audio tracks and having analog controls including, for each audio track, a slider for adjusting speed, a main output volume knob for adjusting volume heard on a main speaker output, and including a preview switch for audio tracks, each audio track having a digital to analog converter, two audio outputs including a headphone output and the main speaker output, the headphone output also including analog controls for adjusting a volume of audio mix heard on the headphone, said headphone output activated by the preview switch, an LCD screen and buttons on the device for selecting and queuing sound recordings that appear on the LCD screen in each audio track, a computer, including a processor, ROM storage means, RAM storage means, a hard disc to store audio sound track files, and software for decoding each audio track from compressed digital audio data format to digital format, applying special effects to each audio track based on speed parameters supplied by the sliders and sending each audio track in digital format to a digital to analog convertor associated with each audio track for conversion to analog format, an analog audio mixing circuit connecting the analog controls to an output of the digital to analog convertors for each audio track for performing analog mixing, said single device allowing a disc jockey to manually mix compressed digital audio data sound recordings with level of manual dexterity typically used in the mixing of vinyl LP records, said level of manual dexterity far exceeding the level of manual dexterity provided by a computer pointing device, wherein the analog controls include a crossfader for single-handed fading from one audio track to another onthe main speaker output, and wherein the crossfader has an on/off switch, a left crossfader switch having settings corresponding to each audio track on the disc jockey mixing console, a right crossfader switch having settings corresponding to each audio track on the disc jockey mixing console and a crossfader slider between the left crossfader switch and the right crossfader switch, and wherein manual placement of the crossfader slider on a left end triggers the audio track that corresponds to the setting on the left crossfader switch to be audible on the main speaker output, wherein manual placement of the crossfader slider on a right end triggers the audio track that corresponds to the setting on the right crossfader switch to be audible on the main speaker output and wherein placement of the crossfader slider in a middle area triggers both the audio track that corresponds to the setting on the left crossfader switch and the audio track that corresponds to the setting on the right crossfader switch to be simultaneously audible on the main speaker output.

* * * * *